UNITED STATES PATENT OFFICE.

LYMAN H. SWAN, OF IMLAY CITY, MICHIGAN.

SULFUR CANDLE.

SPECIFICATION forming part of Letters Patent No. 647,770, dated April 17, 1900.

Application filed December 9, 1897. Serial No. 661,295. (No specimens.)

*To all whom it may concern:*

Be it known that I, LYMAN H. SWAN, a citizen of the United States, residing at Imlay City, county of Lapeer, State of Michigan, have invented a certain new and useful Improvement in Means for Preserving Food; and I declare the following to be a full, clear, and exact description of the invention, such as will enable others skilled in the art to which it pertains to make and use the same, reference being had to the accompanying drawings, which form a part of this specification.

This invention relates to means for preserving food, and has for its object an improved candle to be used in preserving food. This candle may be employed in preserving meats of any kind and also in preserving vegetables, although my experience has been mainly confined to the use of it with animal substances. Still I have found by experiment that it can be used with efficiency with some, at least, of the vegetable substances.

In preparing the preserving means I make what I will term a "sulfur candle," being a candle manufactured from sulfur and having a wick impregnated with niter, and I use this candle for the generation of a gas to which the article to be preserved is exposed. In manufacturing the candle I first dissolve niter or saltpeter in water, making a saturated solution of the niter, using a quantity of water sufficient to saturate so much wicking as I may desire to prepare. For ordinary use I prepare a wick of loosely-spun cotton, such as the ordinary candle-wicking of commerce, by folding and loosely twisting two or three of the strands together, making a wick of the size of an ordinary lead-pencil. This wick after having been soaked in the saturated solution of saltpeter is thoroughly dried. Around it is formed a casing of sulfur. My practice has been to make this casing by dipping the wick in melted sulfur, much in the same way that what were once known as "dipped" candles were made; but of course sulfur may be cast around the wick in any other way. With a wick the size of a lead-pencil the surrounding coating of sulfur is made from a quarter to three-eighths of an inch thick, so that the finished candle is about an inch in diameter, my experience having shown that a saturated wick of a size mentioned will contain an amount of niter sufficient to supply oxygen for the consumption of the amount of sulfur in a candle of that size after ignition.

The meat to be treated is not prepared in any way, except that it is allowed to hang after butchering until the animal heat has escaped, and it is cut into the shape and size that will be most convenient for handling. If for shipment, it may be left in quarters, and if for domestic use it may be cut into smaller sizes. The meat is hung in a closed room or closed vessel, the candle is fired and placed in the room, and the meat is exposed to the fumes of the candle for a period of about thirty minutes. The size of the candle should be in proportion to the size of the chamber that the meat is exposed in and sufficient to permit of its burning for thirty minutes and filling the chamber full of the produced gases. At the end of that time the chamber is opened, and as soon as the gases have passed out, so that a person may enter, the meat can be packed away for future use and will remain in good condition for an indefinite period of time. My experience has shown that after an entire summer of exposure meat prepared in this way remains in perfect condition. Neither flies nor insects will touch it, and no further preparation is necessary when it is desired to use it.

To preserve fruits or vegetables, the fruits or vegetables are placed in a jar covered with water and the jar with its contents are exposed to the fumes of the candle. There will form on the surface of the water a scale which should not be disturbed until it is desired to use the fruit or vegetable, as after this scale is broken and any portion of the fruit is again exposed to the air that portion is liable to decay.

I am aware that sulfur candles have been provided with a priming of potassium chlorate or nitrate for the purpose of facilitating the ignition of the same. I do not claim that process, but limit myself to a candle containing in its wick sufficient potassium nitrate to effect an improved antiseptic or preserving action upon food and in which the undesirable bleaching or discoloring action of sulfurous acid is avoided.

What I claim is—

A candle for the purpose specified, consisting of a wick, impregnated with niter and a body of sulfur surrounding the same, the relative size of the impregnated wick being such as to supply sufficient oxygen to consume the sulfur after ignition.

In testimony whereof I sign this specification in the presence of two witnesses.

LYMAN H. SWAN.

Witnesses:
J. A. SWAN,
VIRGINIA M. CLOUGH.